(12) United States Patent
Shimodaira et al.

(10) Patent No.: US 8,297,815 B2
(45) Date of Patent: Oct. 30, 2012

(54) VEHICLE LAMP

(75) Inventors: Yoshifumi Shimodaira, Shizuoka (JP);
Gosuke Ohashi, Shizuoka (JP);
Nobukazu Ishikawa, Aichi (JP); Yuichi Shibata, Shizuoka (JP); Hiroyuki Serizawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 143 days.

(21) Appl. No.: 12/962,062

(22) Filed: Dec. 7, 2010

(65) Prior Publication Data

US 2011/0134654 A1    Jun. 9, 2011

(30) Foreign Application Priority Data

Dec. 8, 2009   (JP) .................. 2009-278211

(51) Int. Cl.
*B60Q 3/04* (2006.01)
*F21S 8/10* (2006.01)
*F21V 11/00* (2006.01)
*F21V 21/00* (2006.01)
*F21V 29/00* (2006.01)

(52) U.S. Cl. .......... 362/543; 362/507; 362/544

(58) Field of Classification Search .......... 362/507, 362/509–510, 543–545
See application file for complete search history.

(56) References Cited

U.S. PATENT DOCUMENTS

2006/0285341 A1   12/2006   Yatsuda et al.
2009/0086500 A1   4/2009   Tatara et al.

FOREIGN PATENT DOCUMENTS

| DE | 100 14 301 A1 | 10/2000 |
| DE | 10 2009 010 508 A1 | 10/2009 |
| EP | 2 213 512 A1 | 8/2010 |
| FR | 2 889 869 A1 | 2/2007 |
| JP | 2003-59317 A | 2/2003 |
| JP | 2009-126444 A | 6/2009 |
| JP | 2009-211854 A | 9/2009 |

OTHER PUBLICATIONS

Extended European Search Report dated Apr. 12, 2011, in Application No. 10194076.5.

*Primary Examiner* — Jason Moon Han
(74) *Attorney, Agent, or Firm* — Sughrue Mion, PLLC

(57) ABSTRACT

A vehicle lamp including a main lamp unit that forms a main light distribution pattern for a headlamp, and an additional lamp unit that emits blue light or mixed light including blue light to form a lane marker irradiation light distribution pattern, wherein the lane marker irradiation light distribution pattern is superimposed onto the main light distribution pattern.

10 Claims, 9 Drawing Sheets

FIG.8
EVALUATION OF VISIBILITY OF LANE MARK

| MIXING RATIO | RED LIGHT: | 100% | 75% | 50% | 25% | 0% |
|---|---|---|---|---|---|---|
| | BLUE LIGHT: | 0% | 25% | 50% | 75% | 100% |
| RATIO OF MIXED COLOR LIGHT TO LIGHT EMITTED FROM HEADLAMP | 17.2% | | MIXED COLOR LIGHT APPEARS RED AND DOES NOT APPEAR ON LANE MARK | MIXED COLOR LIGHT IS WHITE BUT CLOSE TO MUREX | | BLUE IS STRONGER THAN RED AND THERE IS DISCOMFORT |
| | 8.0% | | | WHITE | | THERE IS FEELING WHERE BLUE FLOATS IF BLUE IS EXCESSIVELY STRONG, THERE IS DISCOMFORT |
| | 4.5% | | MIXED COLOR LIGHT IS SLIGHTLY RED BUT THERE IS NO DISCOMFORT | MIXED COLOR LIGHT IS SLIGHTLY RED AT CENTER VIEW, BUT BLUE AT PERIPHERAL VIEW | VISIBILITY OF MIXED COLOR LIGHT AND VISIBILITY OF LOW-BEAM LIGHT DISTRIBUTION PATTERN ARE NOT SUBSTANTIALLY SAME | MIXED COLOR LIGHT APPEARS BLUISH WHITE PARTICULARLY, MIXED COLOR LIGHT FLOATS TO EASILY APPEAR AT PERIPHERAL VIEW |

VEHICLE LAMP

CROSS-REFERENCE TO RELATED APPLICATION

This application claims priority from Japanese Patent Application No. 2009-278211, filed on Dec. 8, 2009, the entire contents of which are hereby incorporated by reference.

BACKGROUND

1. Technical Field

The present invention relates to a vehicle headlamp adapted to superimpose a lane marker irradiation light distribution pattern over a light distribution pattern.

2. Related Art

In the past, there has been known a vehicle lamp including a lamp unit that is adapted to selectively form a low-beam light distribution pattern or a high-beam light distribution pattern as a light distribution pattern for a headlamp.

JP-A-2003-59317 discloses a vehicle lamp that includes an additional lamp unit in addition to a main lamp unit for forming a light distribution pattern for a headlamp. The additional lamp unit forms an additional light distribution pattern that enhances the brightness of a distant road shoulder portion of the light distribution pattern.

Meanwhile, JP-A-2009-126444 discloses a vehicle lamp that includes an additional lamp unit in addition to a main lamp unit for forming a light distribution pattern for a headlamp. The additional lamp unit forms an additional light distribution pattern that enhances the brightness of a peripheral region of a vehicle visually recognized in the peripheral view of a driver. Also, JP-A-2009-126444 discloses that it is advantageous to irradiate a distant region in front of a vehicle with light including more short-wavelength components than the short-wavelength components of the light irradiating the peripheral region of a vehicle.

The vehicle lamp disclosed in JP-A-2003-59317 can irradiate a lane marker (that is, a white road surface line) on the road surface in front of a vehicle with the additional light distribution pattern that is formed by the additional lamp unit.

However, in the vehicle lamp disclosed in JP-A-2003-59317, a light source of the main lamp unit is a halogen bulb and a light source of the additional lamp unit is a halogen bulb. Accordingly, there is a problem in that the visibility of the lane marker is merely improved by the increase of the amount of light even though an additional light distribution pattern for irradiating the lane marker is superimposed on the light distribution pattern for a headlamp.

Meanwhile, the vehicle lamp disclosed in JP-A-2009-126444 can also irradiate a lane marker on the road surface in front of a vehicle with the additional light distribution pattern that is formed by the additional lamp unit.

However, in the vehicle lamp disclosed in JP-A-2009-126444, both of the normal light distribution pattern and the additional light distribution pattern are formed by the same kind of light or the normal light distribution pattern for the headlamp is formed by light including more short-wavelength components than the short-wavelength components of the additional light distribution pattern. Accordingly, there is a problem in that it is not possible to improve the visibility of the lane marker.

SUMMARY OF THE INVENTION

Exemplary embodiments of the present invention may address the above disadvantages and other disadvantages not described above. However, the present invention is not required to overcome the disadvantages described above or any other disadvantages, and thus, an exemplary embodiment of the present invention may not overcome any disadvantages.

Accordingly, it is an illustrative aspect of the present invention to provide a vehicle lamp capable of superimposing and forming a lane marker irradiation light distribution pattern on a light distribution pattern for a headlamp and can sufficiently improve the visibility of a lane marker.

According to one or more aspects of the present invention, there is provided a vehicle lamp including a main lamp unit that forms a main light distribution pattern for a headlamp, and an additional lamp unit that emits blue light or mixed light including blue light to form a lane marker irradiation light distribution pattern, wherein the lane marker irradiation light distribution pattern is superimposed onto the main light distribution pattern.

Other aspects and advantages of the present invention will be apparent from the following description, the drawings and the claims.

BRIEF DESCRIPTION OF THE DRAWINGS

FIG. 8 is a table showing the results of an application experiment of the embodiment.

DETAILED DESCRIPTION OF EXEMPLARY EMBODIMENTS

Figure 1:
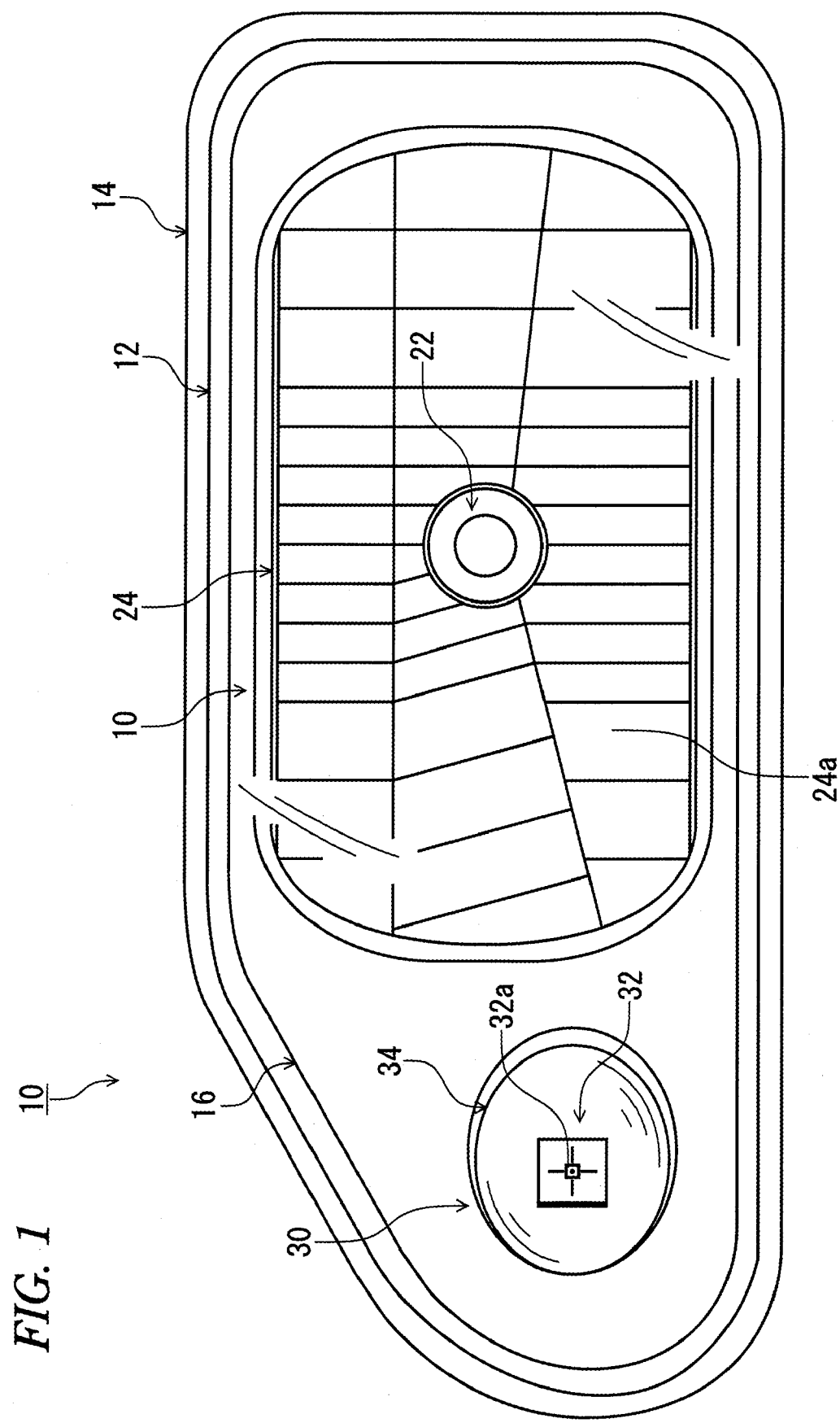
FIG. 1 is a front view of a vehicle lamp according to an exemplary embodiment of the invention.

According to exemplary embodiments of the present invention, there is provided a vehicle lamp including a main lamp unit that forms a main light distribution pattern for a headlamp, and an additional lamp unit that emits blue light or mixed light including blue light to form a lane marker irradiation light distribution pattern, wherein the lane marker irradiation light distribution pattern is superimposed onto the main light distribution pattern.

The "main lamp unit" is configured to form a light distribution pattern for a headlamp. However, if the main lamp unit has a function of forming at least a low-beam light distribution pattern as the "light distribution pattern" in this case, the main lamp unit may have only a function of forming a low-beam light distribution pattern and may have a function of selectively forming the low-beam light distribution pattern and another light distribution pattern (e.g., a high-beam light distribution pattern).

The "lane marker irradiation light distribution pattern" indicates a light distribution pattern for irradiating a lane marker on the road surface at the front side of a vehicle. In this case, the lane marker may be a lane marker close to the shoulder of a road, may be a lane marker of an opposite lane or may be both types of lane markers.

As long as the "additional lamp unit" is configured to emit blue light or mixed color light including blue light, the structure of the additional lamp unit is not particularly limited.

The term "blue light" means visible light of which the dominant wavelength is 490 nm or less. More preferably, the term blue light means visible light of which the dominant wavelength is 485 nm or less.

In the "mixed color light including blue light", color light other than blue light included in the mixed color light is not particularly limited.

According to the present invention, the vehicle lamp is capable of superimposing and forming a lane marker irradiation light distribution pattern on a light distribution pattern for a headlamp. However, since the additional lamp unit for forming the lane marker irradiation light distribution pattern is adapted to irradiate blue light or mixed color light including blue light, it may be possible to obtain the following advantages.

That is, in the past, a phenomenon known as the Purkinje shift, where a wavelength where the maximum spectral luminous efficacy is shifted to a short-wavelength side as vision proceeds to a scotopic vision from a photopic vision via a mesopic vision has been obtained. This relates to spectral luminous efficacy in a central visual field (that is, a peripheral region of a point of gaze). However, the fact that the same phenomenon occurs even in a peripheral visual field (that is, a peripheral view region) was obtained as a conclusion of the experimental research of the inventors of the invention. Specifically, the following fact has been concluded: if a peripheral visual field is irradiated with blue light or mixed color light including blue light when the entire visual field is irradiated with white light, the visibility of the peripheral visual field is significantly improved even though the luminance of the peripheral visual field is equal to that of the central visual field.

In the present invention, on the basis of the above-mentioned conclusion, a structure that irradiates blue light or mixed color light including blue light is employed as the additional lamp unit for forming a lane marker irradiation light distribution pattern. Accordingly, it may be possible to improve the visibility of a lane marker. In addition, since the lane marker is generally a white line, it may be possible to further improve the visibility of the lane marker by irradiating the lane marker with blue light or mixed color light including blue light.

As described above, according to the invention, it may be possible to sufficiently improve the visibility of the lane marker using the vehicle lamp that is adapted to be capable of superimposing and forming the lane marker irradiation light distribution pattern on the light distribution pattern for a headlamp.

In the above-mentioned structure, color light other than blue light included in the mixed color light, which includes blue light, is not particularly limited as described above. However, if the mixed color light including blue light is mixed color light of blue light and red light, it may be possible to obtain the following operational advantages.

That is, since red light has high reflectance on the human skin, it may be possible to improve the visibility of not only a lane marker but also a pedestrian by mixing red light with blue light. Here, the term "red light" means visible light of which the dominant wavelength is 600 nm or more. More preferably, the term red light means visible light of which the dominant wavelength is 620 nm or more.

If a light-emitting element (for example, a light-emitting diode or the like), which emits blue light or mixed color light including blue light, is used as a light source of the additional lamp unit in the above-mentioned structure, it may be possible to form the lane marker irradiation light distribution pattern by blue light or mixed color light including blue light with a simple structure.

If a light source of the main lamp unit is a halogen bulb in the above-mentioned structure, white light of which the color temperature is lower, as compared to when a discharge bulb or the like is used, as the light source is irradiated and a light distribution pattern for a headlamp, which slightly takes on a yellow tinge, is formed. Accordingly, the visibility of the lane marker is slightly lowered. Therefore, it is particularly effective that the lane marker irradiation light distribution pattern is formed by blue light or mixed color light including blue light.

If the luminance of the lane marker irradiation light distribution pattern is excessively increased in the above-mentioned structure, a blue tinge becomes strong, so that a driver of a subject vehicle feels discomfort. Accordingly, it is preferable that the maximum luminance of the lane marker irradiation light distribution pattern be set to a value equal to or lower than 10% of the maximum luminance of a portion of the light distribution pattern for a headlamp overlapping the lane marker irradiation light distribution pattern. Further, it is more preferable that the maximum luminance of the lane marker irradiation light distribution pattern be set to a value equal to or lower than 8% of the maximum luminance of the portion of the low-beam light distribution pattern overlapping the lane marker irradiation light distribution pattern.

Exemplary embodiments of the present invention will now be described with reference to the drawings.

FIG. 1 is a front view of a vehicle lamp 10 according to this embodiment.

As shown in FIG. 1, the vehicle lamp 10 includes a main lamp unit 20, an additional lamp unit 30, and an extension panel 16. The main lamp unit 20 and the additional lamp unit 30 are housed in a lamp chamber, which is formed by a plane translucent cover 12 and a lamp body 14, together with the extension panel 16 surrounding the main lamp unit 20 and the additional lamp unit 30.

The main lamp unit 20 is a parabolic lamp unit. The main lamp unit 20 includes an H4 halogen bulb 22 that is used as a light source and a reflector 24 that reflects forward light emitted from the H4 halogen bulb 22.

Further, the main lamp unit 20 reflects forward light, which is emitted from a low-beam filament or a high-beam filament of the H4 halogen bulb 22, as diffused light or deflected light by the reflecting surface 24a of the reflector 24 thereof. Accordingly, the main lamp unit 20 may selectively form a low-beam light distribution pattern and a high-beam light distribution pattern.

The additional lamp unit 30 is a direct-projection type lamp unit. The additional lamp unit 30 includes a light-emitting element 32 that is used as a light source, and a lens 34 that deflects and emits forward light emitted from the light-emitting element 32. In this case, the light-emitting element 32 is a light-emitting diode (LED) that emits blue light, and the dominant wavelength of the light emitted from the light-emitting element is set to about 470 nm.

Further, the additional lamp unit 30 emits forward light, which is emitted from a light-emitting chip 32a of the light-emitting element 32, as diffused and deflected light by the lens 34 thereof Accordingly, the additional lamp unit forms a lane marker irradiation light distribution pattern.

Figure 2:
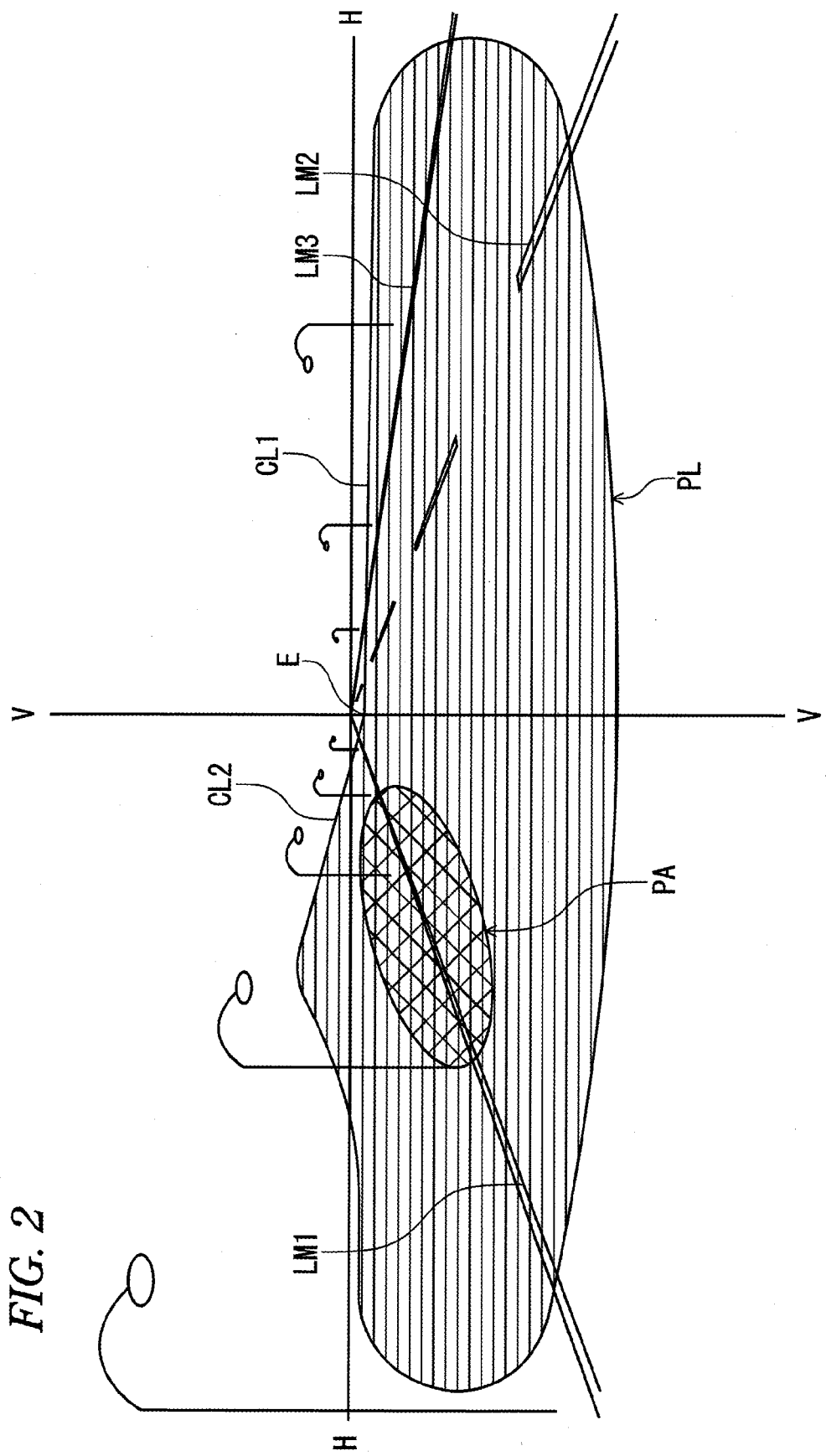
FIG. 2 is a perspective view showing a low-beam light distribution pattern and a lane marker irradiation light distribution pattern formed on a virtual vertical screen, which is disposed 25 m ahead of the lamp, by light irradiated forward from the vehicle lamp.

FIG. 2 is a perspective view showing the low-beam light distribution pattern PL and the lane marker irradiation light distribution pattern PA formed on a virtual vertical screen, which is disposed at a position 25 m ahead of the lamp, by light irradiated forward from the vehicle lamp 10.

Meanwhile, in FIG. 2, for convenience, the vehicle lamp 10 is arranged in the middle of a traveling lane, on which a subject vehicle travels, on a road having two lanes where vehicles should keep to the left. FIG. 2 shows the road surface at the front side of a vehicle, the low-beam light distribution pattern PL, and the lane marker irradiation light distribution pattern PA. In this state, a lane marker LM1 close to the shoulder of a road is positioned at the left side of the traveling lane on which a subject vehicle is traveling, and a lane marker LM2 of a center line is positioned at the right side of the traveling lane on which a subject vehicle is traveling. The lane markers LM1 and LM2 extend obliquely downward from a H-V point, which is a vanishing point positioned at the front side of the lamp, toward the left and right sides at the same angle. Further, a lane marker LM3 of an opposite lane extends obliquely downward from the H-V point toward the right side at an angle close to an angle corresponding to the horizontal line as compared to the lane marker LM2 of the center line.

As shown in FIG. 2, the low-beam light distribution pattern PL is a left low-beam light distribution pattern. The low-beam light distribution pattern PL has a cut-off line, which is formed of a horizontal cut-off line CL1 and an oblique cut-off line CL2, at the upper end edge thereof. In this case, the horizontal cut-off line CL1 is formed at one side of a V-V line, which is a vertical line passing through the H-V point, close to the opposite lane. The oblique cut-off line CL2 is formed so as to be inclined upward (for example, 15°) toward the traveling lane from an intersection of the horizontal cut-off line CL1 and the V-V line. Further, an elbow point E, which is the intersection of the horizontal cut-off line CL1 and the oblique cut-off line CL2, is positioned below the H-V point by an angle of about 0.5 to 0.6°.

The low-beam light distribution pattern PL is formed by the light that is irradiated from the main lamp unit 20 using the H4 halogen bulb 22 as a light source (that is, the low-beam light distribution pattern is formed by white light of which the color temperature is lower as compared to when a discharge bulb or the like is used as the light source). Accordingly, the low-beam light distribution pattern is a light distribution pattern that slightly takes on a yellow tinge.

Meanwhile, the lane marker irradiation light distribution pattern PA is a substantially spot-like light distribution pattern that is slightly elongated so as to extend downward toward the left side from a point positioned at the lower left side of the elbow point E of the low-beam light distribution pattern PL. The lane marker irradiation light distribution pattern PA is formed while being superimposed on the low-beam light distribution pattern PL. Further, the lane marker irradiation light distribution pattern PA is formed so as to irradiate the lane marker LM1, which is close to the shoulder of a road, among three lane markers LM1, LM2, and LM3.

In addition, in FIG. 2, the lane marker irradiation light distribution pattern PA is completely superimposed on the low-beam light distribution pattern PL, but the exemplary embodiment of the invention is not limited thereto. For example, the lane marker irradiation light distribution pattern PA may be partially superimposed on the low-beam light distribution pattern PL.

The lane marker irradiation light distribution pattern PA is formed by the light irradiated from the additional lamp unit 30 using the light-emitting element 32, which emits blue light, as a light source. Accordingly, the lane marker irradiation light distribution pattern is a blue light distribution pattern. In this case, the maximum luminance of the lane marker irradiation light distribution pattern PA is set to a value that is equal to or lower than 10% (for example, a value of about 5%) of the maximum luminance of a portion of the low-beam light distribution pattern PL overlapping the lane marker irradiation light distribution pattern PA. Accordingly, the portion where the low-beam light distribution pattern PL overlaps the lane marker irradiation light distribution pattern PA somewhat takes on a blue tinge as compared to other portions. However, there is no concern that a driver of the subject vehicle feels discomfort due to this.

The details of experimental research concerning the employment of the structure of the vehicle lamp 10 according to this embodiment will be described below.

From the results of the experimental research to be described below, as a conclusion, the inventors of the invention deduced the fact that if a peripheral visual field is irradiated with blue light or mixed color light including blue light when the entire visual field is irradiated with white light, the visibility of the peripheral visual field is significantly improved even though the luminance of the peripheral visual field is equal to that of the central visual field.

The experimental research was performed through three experiments, that is, a basic experiment, a main experiment, and an application experiment. Each of the three experiments will be described below.

1. Basic Experiment (Experiment for Confirming Relationships Between a Recognition Rate/Recognition Time and Color Stimulus of Monochromatic Light)

(1) Purpose of Experiment

Relationships between a recognition rate/recognition time and color stimulus of monochromatic light were examined to study the wavelength distribution of illumination light that is easily recognized in response to a visual object (for example, a lane marker, a pedestrian, or the like) under a mesopic environment.

(2) Experimental Method

While white light was irradiated on a gray screen from a projector lamp, Landolt rings (that is, the shape of the letter "C" of the alphabet) were depicted at four positions on the screen by a plurality of kinds of color light. In this case, the directions of the respective Landolt rings were randomly set. Further, the recognition rates of the Landolt rings (the ratio of the correct response to the directions of the Landolt rings) and time taken for examinees to recognize the respective Landolt rings were measured from the examinees' responses to the directions of the respective Landolt rings.

In this case, in order to create the mesopic environment, background luminance was set to 0.3 cd/m$^2$ (=square meter) by the light irradiated from the projector lamp.

Further, white light and four kinds of monochromatic light, that is, blue light, green light, yellow light, and red light were used as color light used for depicting the Landolt rings.

The experiment was performed by three examinees.

(3) Result of Experiment

FIG. 3 shows the results of the experiment.

Figure 3A:
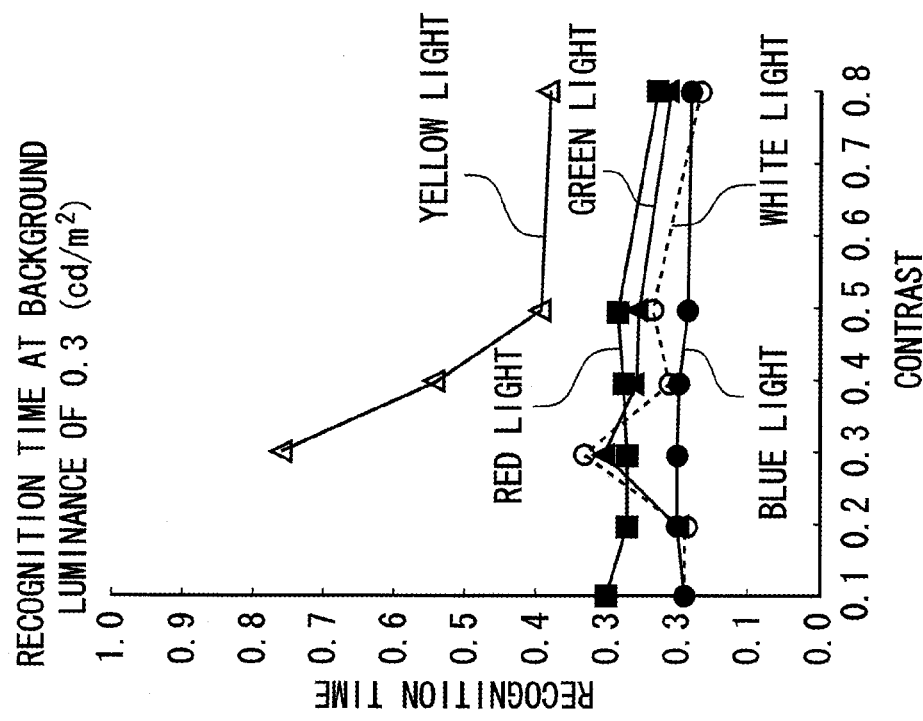
FIGS. 3A and 3B are graphs showing basic experiment results according to the embodiment.

FIG. 3A is a graph showing a relationship between the recognition rates of the Landolt rings and the level of contrast between the Landolt rings, which are formed on the screen, and the background thereof. Further, FIG. 3B is a graph showing a relationship between the level of contrast and the recognition time.

(4) Conclusions

From the graphs shown in FIG. 3A, the following was found: when contrast is reduced, a recognition rate is rapidly lowered in the cases of white light, green light, and yellow light. In contrast, even though contrast is reduced, the recognition rate is scarcely lowered in the cases of blue light and red light. The recognition rate is particularly high in the case of blue light.

Figure 3B:
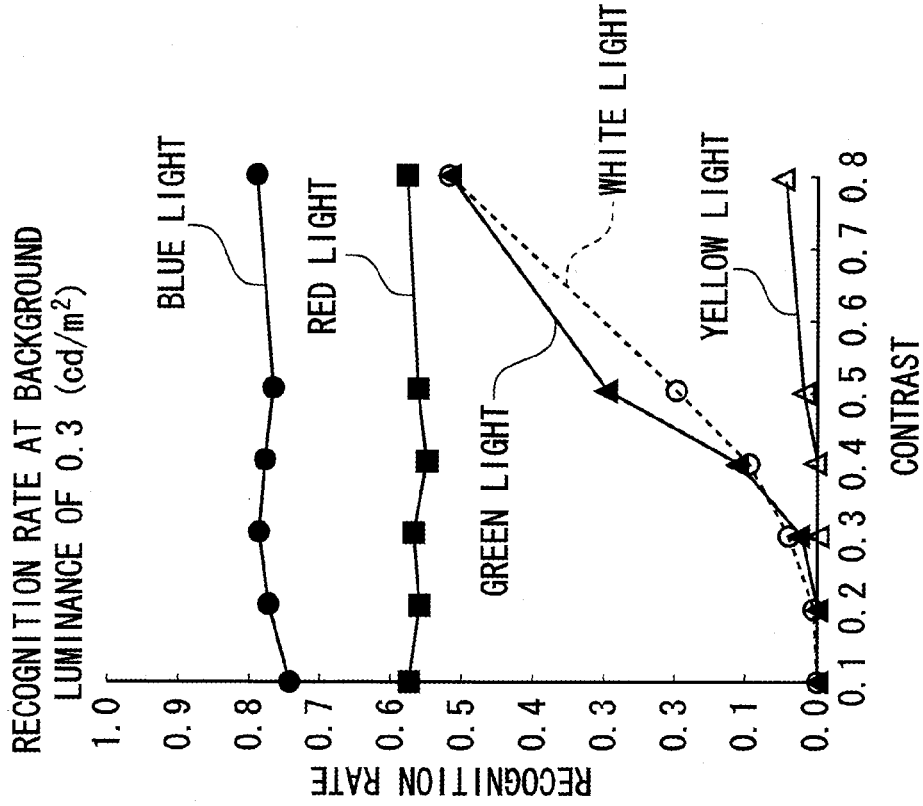

Further, from the graphs shown in FIG. 3B, the following was found: recognition time is substantially constant regardless of the level of contrast in the cases of the other color lights except for yellow light, and recognition time is slightly shorter in the case of blue light.

2. Main Experiment (Experiment for Measuring Detection Limit of Mixed Color Light)

(1) Purpose of Experiment

It makes no sense at all that blue light or red light is used alone in a headlamp. Accordingly, a detection limit was measured in the case of mixed color light obtained by mixing blue light with other color light.

Meanwhile, a detection limit, where an examinee feels a difference in color between white light and mixed light when monochromatic light is gradually added to white light, is referred to as a "purity discrimination threshold". However, since the color light to be added is mixed color light in the main experiment, the detection limit is referred to as a "detection limit".

(2) Experimental Method

While white light was irradiated on a gray screen from a projector lamp in a darkroom having a brightness of about 1 Lux, the luminance (that is, background luminance) of the screen was set to three levels, that is, 0.1, 0.3, and 0.5 cd/m$^2$.

Mixed color light obtained by the mixture of two of blue light (Bl: 405 nm), green light (Gr: 523 nm), yellow light (Ye: 572 nm), and red light (Re: 680 nm) was used as the mixed color light.

In this case, the following three ratios were set as a mixing ratio.

(I) A mixing ratio where the respective colors of the color lights are mixed at a luminance ratio of 1:1 while focusing on a "luminance value".

(II) A mixing ratio where the respective colors are mixed (except for a Ye component) at a brightness coefficient-luminance ratio (i.e., a luminance ratio of Re:Gr:Bl=1: 4.59:0.06) while focusing on the "feeling of brightness".

(III) A mixing ratio where each color light is mixed so that the luminance of the Ye component is added to the luminance of each of the Re, Gr, and Bl components at a luminance ratio of Re, Gr, and Bl:Ye=1:4.

The experiment was performed under the respective conditions (I) to (III) at the three levels of background luminance by three examinees.

Figure 4:
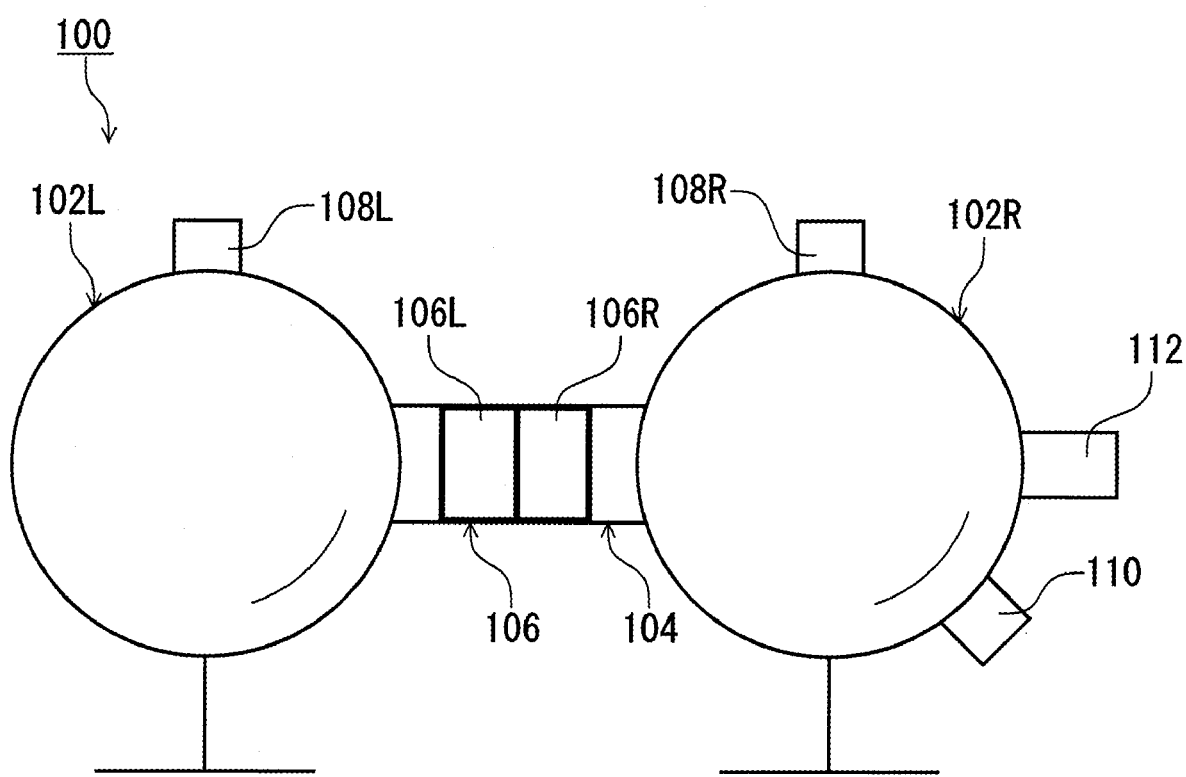
FIG. 4 is a front view of a dual viewing device used in the main experiment of the embodiment.

This experiment was performed using a dual viewing device 100 shown in FIG. 4.

The dual viewing device 100 is configured so that a prism 106 is disposed at a connecting portion 104 between a pair of (left and right) integrating spheres 102L and 102R to form dual visual fields and a pair of (left and right) prism surfaces 106L and 106R may be observed from the outside. Further, white light source units 108L and 108R for providing white light (specifically, halogen light) into the integrating spheres 102L and 102R are mounted on the integrating spheres 102L and 102R, respectively. Furthermore, an LED light source unit 110 for providing arbitrary color light into the integrating sphere 102R and a measurement unit 112 for measuring luminance are mounted on the right integrating sphere 102R.

The dual viewing device 100 generates low-luminance white light, which becomes adaptable light, on one visual field (the dual visual field corresponding to the integrating sphere 102L) of the dual visual fields, and generates stimulus light by mixing color light with white reference light on the other visual field (the dual visual field corresponding to the integrating sphere 102R). Then, the dual viewing device forms the dual visual fields by combining the white light with the stimulus light with the prism 106 that is provided in the middle of the dual viewing device. In this case, the dual viewing device 100 is automatically adjusted so that the luminances of the dual visual fields (that is, the luminances of the pair of (left and right) prism surfaces 106L and 106R) are equal to each other.

This experiment was performed with the following procedure.

Firstly, before the start of the experiment, examinees are adapted to darkness for 30 minutes under a low-illuminance environment.

Next, the same low-luminance white light was provided to the pair of (left and right) integrating spheres 102L and 102R (that is, both view regions of the dual visual fields). Further, each of the examinees kept an eye on the pair of (left and right) prism surfaces 106L and 106R of the prism 106 from a position that is distant from the prism surfaces at the front side of the prism surfaces by a distance of about 50 cm.

In this state, the examinee determined a detection limit, where the examinee felt a difference in color between both the prism surfaces 106L and 106R by the examinee adding mixed color light to only the right view region (integrating sphere 102R) by the examinee's own operation. At the time of the determination of the detection limit, luminance added at this time was measured by an observer.

(3) Result of Experiment

FIGS. 5 to 7 show the results of the experiment.

FIG. 5 is a graph showing the results in the case of mixing ratio (I), that is, the respective colors of Bl, Gr, Ye, and Re lights are mixed at a luminance ratio of 1:1. FIG. 6 is a graph showing the results in the case of mixing ratio (II), that is, the case where the respective colors are mixed at a luminance ratio of Re:Gr:Bl=1:4.59:0.06. FIG. 7 is a graph showing the results in the case of mixing ratio (III), that is, the case where the respective color lights are mixed at a luminance ratio of Re, Gr, and Bl:Ye=1:4.

Figure 5A:
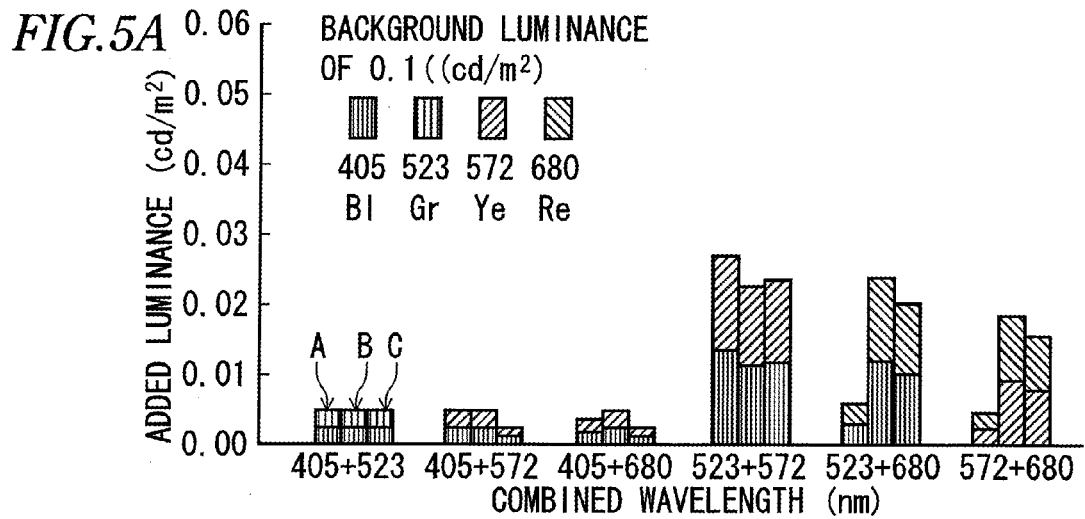
FIGS. 5A to 5C are graphs (#1) showing the results of the main experiment.
Figure 5B:
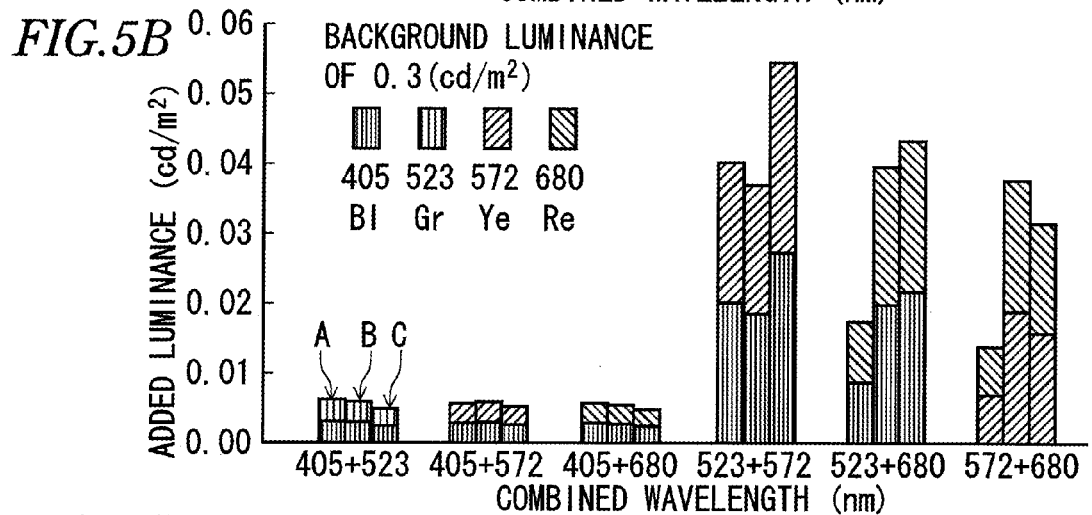
Figure 5C:
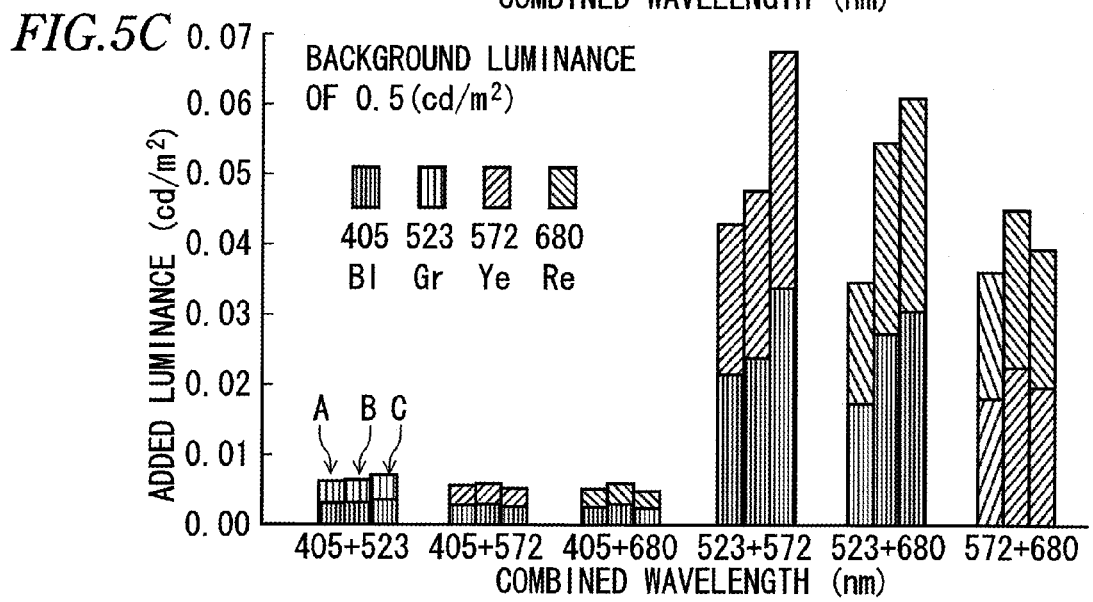
Figure 6A:
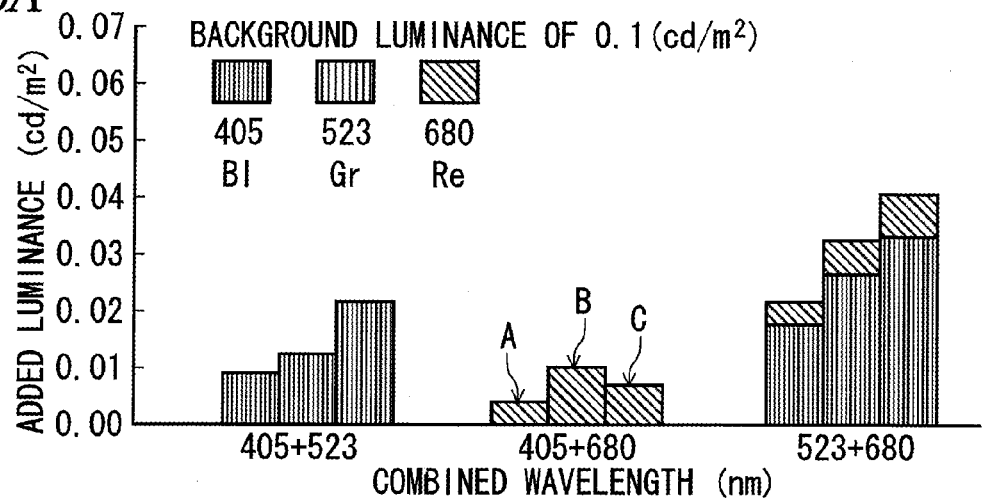
FIGS. 6A to 6C are graphs (#2) showing the results of the main experiment.
Figure 6B:
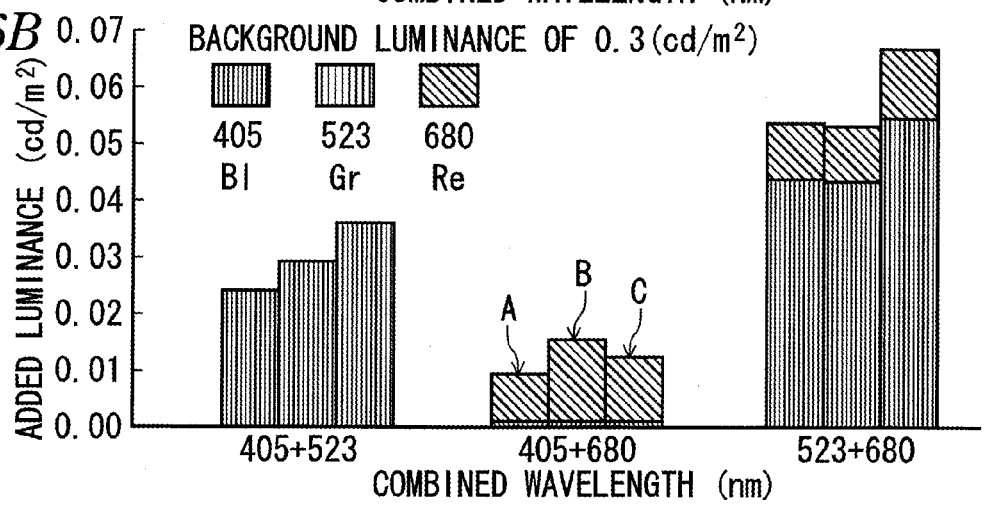
Figure 6C:
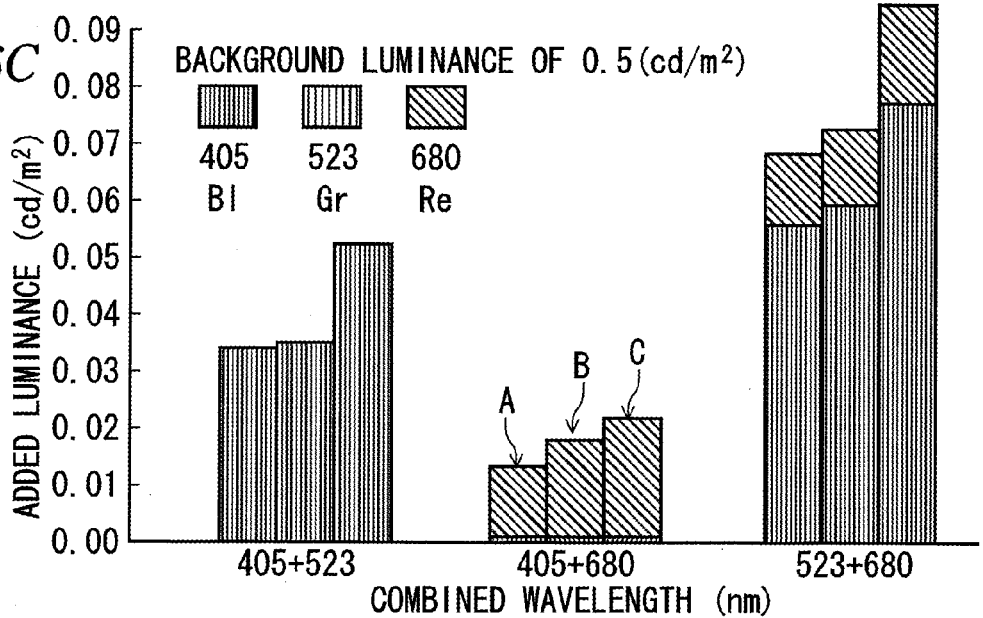
Figure 7A:
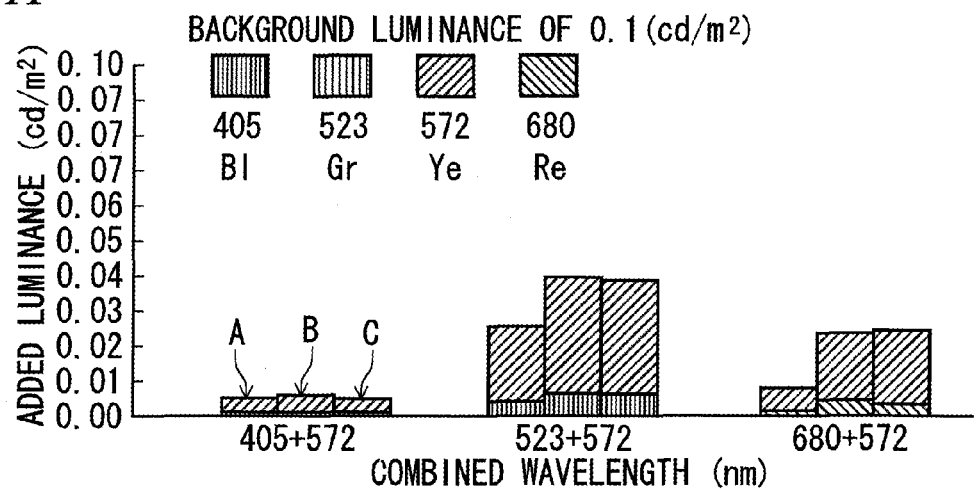
FIGS. 7A to 7C are graphs (#3) showing the results of the main experiment.
Figure 7B:
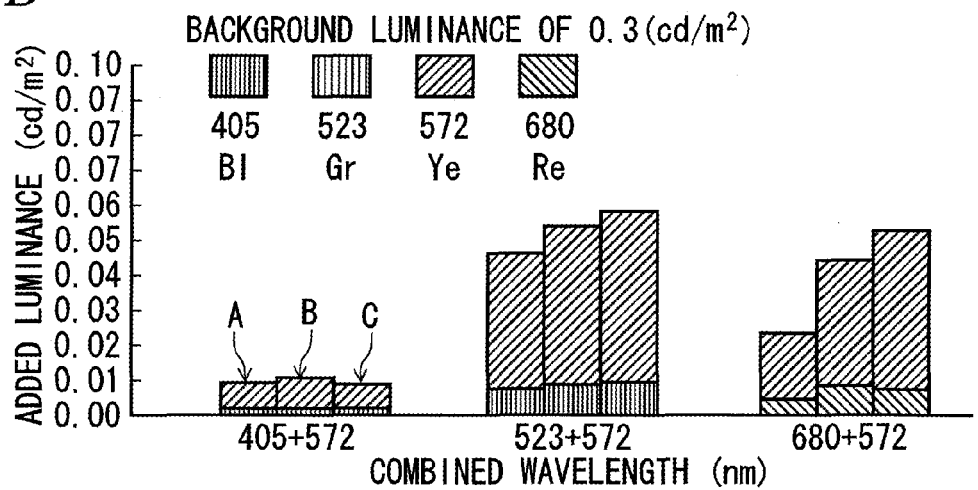
Figure 7C:
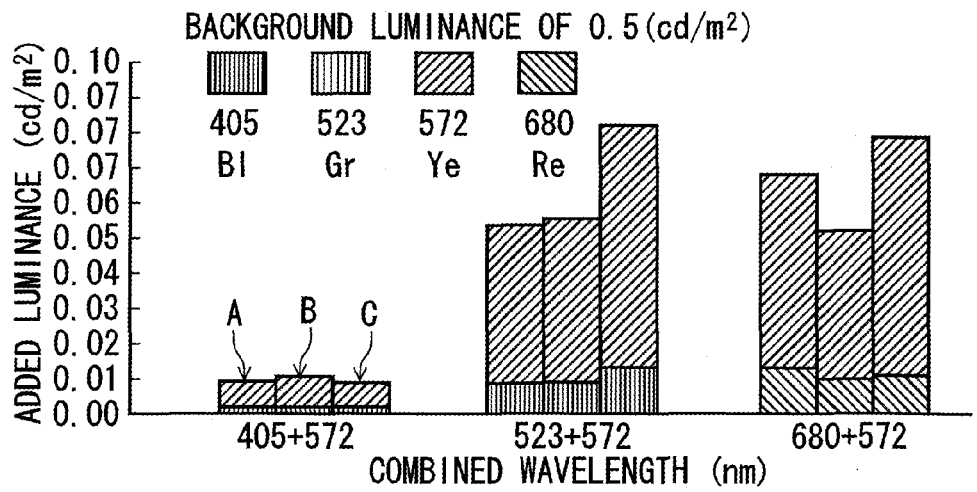

In FIGS. 5 to 7, each of FIGS. 5A, 6A, and 7A shows a case where background luminance is 0.1 cd/m$^2$, each of FIGS. 5B, 6B, and 7B shows a case where background luminance is 0.3 cd/m$^2$, and each of FIGS. 5C, 6C, and 7C shows a case where background luminance is 0.5 cd/m$^2$. Further, in each of these cases, the results for three examinees are shown by graphs A, B, and C, respectively.

In each of these graphs, the "combined wavelength" represented on the horizontal axis is the wavelength corresponding to the mixed color light where colors are mixed so as to correspond to six kinds of combinations, and the "added luminance" represented on the vertical axis is the luminance corresponding to a detection limit Small luminance means that a detection limit is small, that is, the examinee's discrimination ability is high.

(4) Conclusions

From the graphs shown in FIGS. 5 to 7, the following was found: if blue light is mixed with other color light even when a mixing ratio is any one of (I), (II), and (III), a detection limit is significantly reduced in any combination as compared to when color lights except for blue light are mixed with each other.

In this case, from the graphs shown in FIGS. 6 and 7, the following was found: if blue light is mixed with the other color lights, a detection limit is sufficiently reduced even though the luminance ratio of the blue light is small.

Further, from the graphs shown in FIG. 6, the following was found: if color light to be mixed with blue light is red light, a detection limit is reduced as compared to when the color light to be mixed with blue light is green light.

Furthermore, from the graphs shown in FIG. 7, the following was found: even when the color light to be mixed with blue light is yellow light and the luminance ratio of blue light is small, a detection limit is sufficiently reduced.

From the above-mentioned conclusions, the following will be understood.

If blue light or mixed color light including blue light is mixed with white light even though the amount of the blue light or mixed color light is small, there is a possibility that the visibility of a lane marker is improved.

In this case, even though white light takes on a yellow tinge, there is the same possibility as the above-mentioned possibility.

Further, when mixed color light including blue light is employed, it is effective that the mixed color light is mixed color light of blue light and red light.

If the mixed color light is mixed color light of blue light and red light as described above, there is a possibility that the visibility of a pedestrian is also improved by the addition of red light of which the reflectance is high on the human skin.

3. Application Experiment (Experiment for Confirming Applicability to Headlamp)

(1) Purpose of Experiment

When the results of the main experiment were reflected on the structure of a headlamp, an experiment for confirming the improvement of the visibility of a lane marker was performed.

Specifically, when mixed color light of blue light and red light was added to the light irradiated from the headlamp as lane marker irradiating light, an appropriate value of the ratio of the mixed color light to be added and an appropriate value of the mixing ratio of the blue light and the red light of the mixed color light were obtained.

(2) Experimental Method

In a darkroom, two lane markers were arranged on right and left sides and each of the lane markers was irradiated by a halogen lamp (specifically, a fog lamp using a halogen bulb as a light source).

In this state, the left lane marker was additionally irradiated with blue light (470 nm) and red light (620 nm) by the light-emitting diode and the left and right lane markers were compared with each other in terms of visibility.

In this case, the light irradiated from the halogen lamp of a base was reduced for the left lane marker additionally irradiated with the mixed color light (blue light+red light) so that the luminance of the left lane marker was equal to that of the right lane marker.

The ratio of the mixed color light (blue light+red light) to be added was set to the luminance of three levels of 17.2%, 8.0%, and 4.5% of the luminance of the light that was irradiated from the headlamp using a halogen bulb as a light source.

Further, the mixing ratios of blue light and red light were set to five ratios, that is, 0%+100%, 25%+75%, 50%+50%, 75%+25%, and 100%+0% at an interval of 25%.

In this case, the chromaticity of the left lane marker, which was irradiated with the mixed color light (blue light+red light), was measured together with the chromaticity of the right lane marker. Moreover, the evaluation of the visibility of the lane marker was performed by organoleptic evaluation based on the impression of each of four examinees.

(3) Result of Experiment

FIG. 8 is a table showing the results of the evaluation of the visibility of the lane markers that are aggregated as the impressions of the four examinees. The impressions of four examinees are disclosed in the respective sections of the table shown in FIG. 8.

Figure 9:
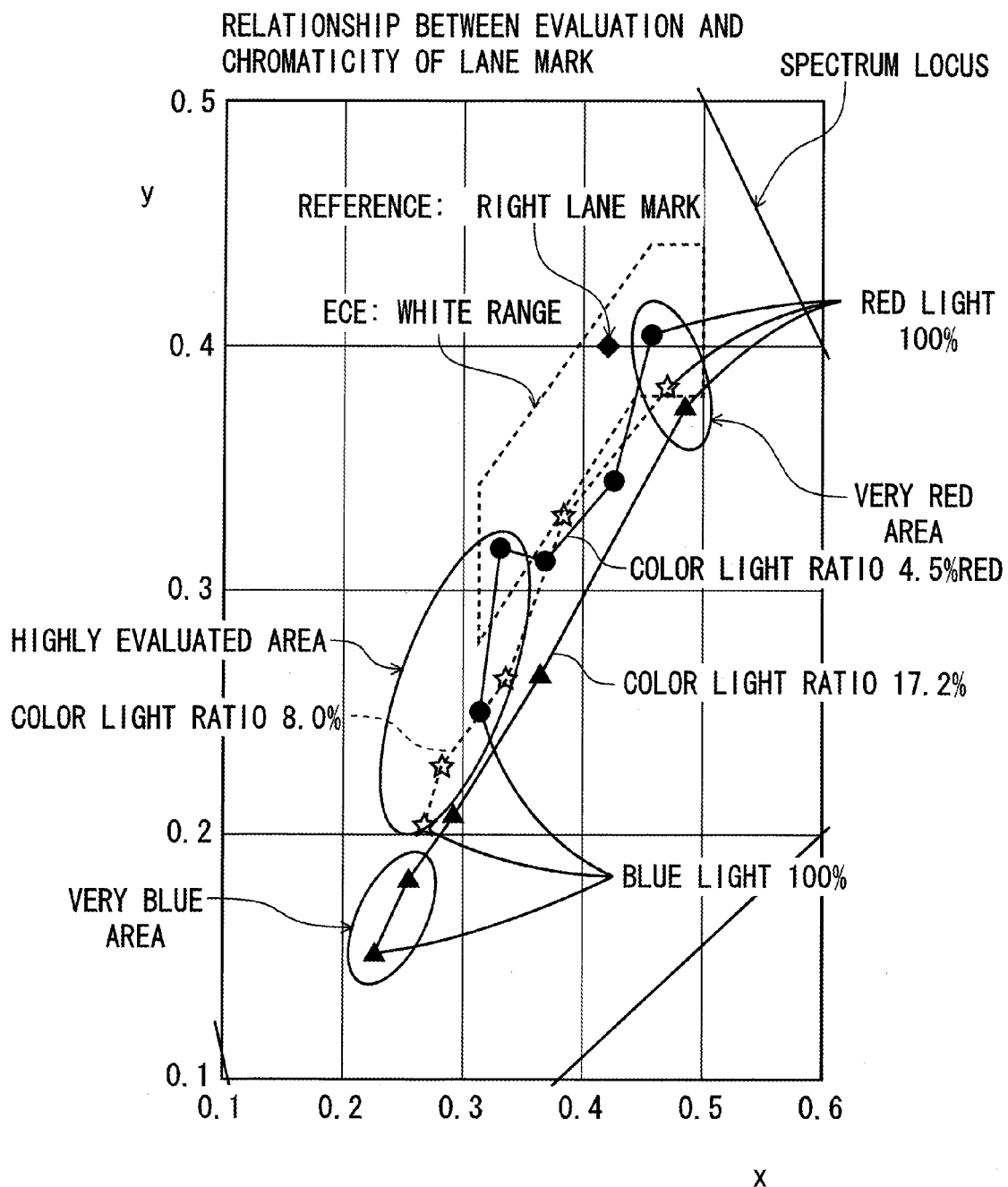
FIG. 9 is a view showing the results of the application experiment using a chromaticity diagram.

Further, FIG. 9 is a view showing a relationship between the evaluation and chromaticity of the lane marker. The evaluation results of the visibility of the lane marker based on the impressions of the four examinees are shown by rough area division in FIG. 9.

(4) Conclusions

As shown in the table of FIG. 8, the impressions of four examinees were different from each other in terms of the mixing ratio of blue light and red light and the ratio of the mixed color light to the light irradiated from the headlamp.

Moreover, it was found that the visibility in the peripheral visual field was particularly improved in a portion surrounded by a thick frame in the table of FIG. 8 (that is, when the ratio of blue light was 75% or more, the ratio of the mixed color light (color light ratio) was 4.5% or 8.0%, and when the ratio of blue light was in the range of 25 to 75% and the color light ratio is 8.0%).

The portion surrounded by the thick frame might be understood as a highly evaluated area even on the chromaticity diagram shown in FIG. 9. The highly evaluated area was a portion near blue light in a white range defined by the ECE standard and an area between the white range and a portion slightly shifted toward the blue light side.

Accordingly, if the lane marker is irradiated with irradiation light having a color light ratio and a mixing ratio of the portion surrounded by the thick frame so that the chromaticity of the lane marker is in a predetermined chromaticity range, it is considered that the visibility of the lane marker can be sufficiently improved.

Next, the operational advantages of this embodiment will be described.

The vehicle lamp 10 according to this embodiment has superimposed and formed the lane marker irradiation light distribution pattern PA on the low-beam light distribution pattern PL. However, since the additional lamp unit 30 for forming the lane marker irradiation light distribution pattern PA has employed the structure for irradiating blue light on the basis of the above-mentioned conclusions, it may be possible to sufficiently improve the visibility of the lane marker LM1.

In addition, since the lane marker LM1 is generally a white line, it may be possible to further improve the visibility of the lane marker LM1 by irradiating the lane marker LM1 with blue light.

As described above, according to this embodiment, it may be possible to sufficiently improve the visibility of the lane marker LM1 in the vehicle lamp 10 capable of superimposing the lane marker irradiation light distribution pattern PA on the low-beam light distribution pattern PL.

In particular, the light-emitting element 32 for emitting blue light (specifically, blue light-emitting diode) has been used as the light source of the additional lamp unit 30 in this embodiment. Accordingly, it may be possible to form the lane marker irradiation light distribution pattern PA by blue light with a simple structure.

Further, a halogen bulb (specifically, the H4 halogen bulb 22) has been used as the light source of the main lamp unit 20 in this embodiment. Accordingly, the low-beam light distribution pattern PL is formed by white light of which the color temperature is lower as compared to when a discharge bulb is used as the light source. For this reason, the low-beam light distribution pattern PL is formed of a light distribution pattern that slightly takes on a yellow tinge, so that the visibility of the lane marker LM1 is slightly lowered. Therefore, as in this embodiment, it is particularly effective that the lane marker irradiation light distribution pattern PA is formed by blue light with the additional lamp unit 30.

Furthermore, in this embodiment, the maximum luminance of the lane marker irradiation light distribution pattern PA is equal to or lower than 10% of the maximum luminance of a portion of the low-beam light distribution pattern PL overlapping the lane marker irradiation light distribution pattern PA. Accordingly, it may be possible to prevent a driver of the subject vehicle from feeling the discomfort that is caused by the excessive increase of the luminance of the lane marker irradiation light distribution pattern PA and a strong blue tinge.

Moreover, an advantage of improving the visibility of the lane marker LM1 is obtained by a small amount of blue light as described above. Accordingly, even though the low-beam light distribution pattern PL slightly takes on a yellow tinge, it may be possible to remove concern that a driver of the subject vehicle feels discomfort.

In addition, since an advantage of improving the visibility of the lane marker LM1 is obtained by a small amount of blue light as described above, it may be possible to employ an inexpensive lamp structure where a current-limiting resistor is merely connected to the light-emitting element 32.

In the above-mentioned embodiment, it goes without saying that the lane marker irradiation light distribution pattern PA may always be superimposed and formed when the low-beam light distribution pattern PL is formed. However, the lane marker irradiation light distribution pattern may be superimposed and formed only when the visibility of the lane marker LM1 or the like needs to be improved.

In the above-mentioned embodiment, there has been described a case where the maximum luminance of the lane marker irradiation light distribution pattern PA is equal to or lower than 10% of the maximum luminance of a portion of the low-beam light distribution pattern PL overlapping the lane marker irradiation light distribution pattern PA. However, if the maximum luminance of the lane marker irradiation light distribution pattern is equal to or lower than 8% of the maximum luminance of the portion of the low-beam light distribution pattern overlapping the lane marker irradiation light distribution pattern, it may be possible to substantially and reliably remove concern that a driver of the subject vehicle feels discomfort.

A case where the additional lamp unit 30 for forming the lane marker irradiation light distribution pattern PA is configured to irradiate blue light has been described in the above-mentioned embodiment. However, even when the additional lamp unit is configured to irradiate mixed color light including blue light, it may be possible to obtain the same operational advantages as those of the above-mentioned embodiment as apparent from the results of the experimental research.

In this case, if the mixed color light including blue light is the mixed color light of blue light and red light, it may be possible to improve the visibility of not only a lane marker LM1 but also a pedestrian by red light of which the reflectance is high on the human skin. Meanwhile, in order to achieve this mixed color light, for example, as the structure of the light-emitting element 32, a light-emitting chip for emitting red light may be disposed adjacent to a light-emitting chip 32a for emitting blue light.

In the above-mentioned embodiment, the main lamp unit 20 has been adapted to form the lane marker irradiation light distribution pattern PA that irradiates the lane marker LM1 close to the shoulder of a road. However, the main lamp unit may be adapted to form a lane marker irradiation light distribution pattern that irradiates the lane marker LM2 of a center line or the lane marker LM3 of the opposite lane.

A case where the lane marker irradiation light distribution pattern PA is superimposed on the low-beam light distribution pattern PL has been described in the above-mentioned embodiment. However, even though the lane marker irradiation light distribution pattern PA is superimposed on the high-beam light distribution pattern, it may be possible to obtain substantially the same operational advantages as those of the above-mentioned embodiment.

A case where the light source of the main lamp unit 20 is the H4 halogen bulb 22 has been described in the above-mentioned embodiment. However, even when a discharge bulb, a white light-emitting diode, or the like is used as the light source, it may be possible to obtain substantially the same operational advantages as those of the above-mentioned embodiment.

The structure of the vehicle lamp 10, which is used under a traffic regulation where vehicles must keep to the left, has been described in the above-mentioned embodiment. However, a structure symmetrical to the structure of the vehicle lamp 10 may be applied under a traffic regulation where vehicles must keep to the right.

Although the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A vehicle lamp comprising:
   a main lamp unit that forms a main light distribution pattern for a headlamp; and
   an additional lamp unit that emits blue light or mixed light including blue light to form a lane marker irradiation light distribution pattern for lighting lane markers on a road surface, wherein the lane marker irradiation light distribution pattern is superimposed onto the main light distribution pattern.

2. The vehicle lamp according to claim 1, wherein the additional lamp unit emits mixed light including blue light and red light.

3. The vehicle lamp according to claim 1,
   wherein the additional lamp unit comprises a light-emitting element that emits blue light or mixed light including blue light.

4. The vehicle lamp according to claim 1,
   wherein the main lamp unit comprises a halogen bulb.

5. The vehicle lamp according to claim 1,
   wherein the maximum luminance of the lane marker irradiation light distribution pattern is equal to or less than 10% of the maximum luminance of the main light distribution pattern onto which the lane marker irradiation light distribution pattern is superimposed.

6. The vehicle lamp according to claim 5,
   wherein the maximum luminance of the lane marker irradiation light distribution pattern is equal to or less than 8% of the maximum luminance of the main light distribution pattern onto which the lane marker irradiation light distribution pattern is superimposed.

7. The vehicle lamp according to claim 2, wherein a ratio of the blue light with respect to the mixed light is in a range of about 25% to about 75%, and wherein the maximum luminance of the lane marker irradiation light distribution pattern is about 8% of the maximum luminance of the main light distribution pattern onto which the lane marker irradiation light distribution pattern is superimposed.

8. The vehicle lamp according to claim 1, wherein the lane marker irradiation light distribution pattern is partially superimposed onto the main light distribution pattern.

9. The vehicle lamp according to claim 1, wherein the lane marker irradiation light distribution pattern is completely superimposed onto the main light distribution pattern.

10. The vehicle light according to claim 1, wherein the additional lamp unit comprises a light-emitting diode.

* * * * *